Sept. 13, 1949.  C. OFFENHAUSER  2,481,775
CUTTING MACHINE
Filed July 11, 1945  3 Sheets-Sheet 1
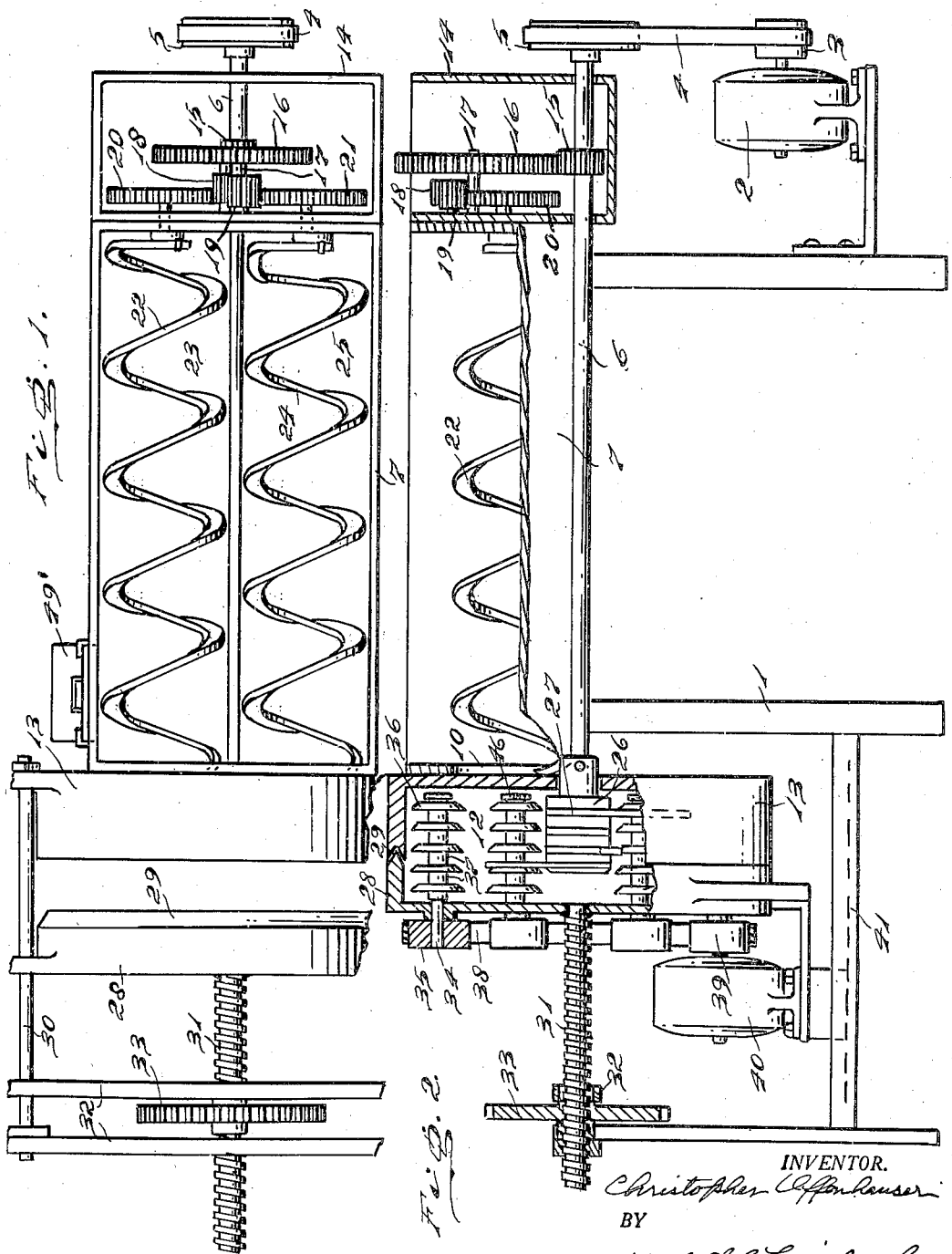
INVENTOR.
Christopher Offenhauser
BY
Herbert P. Fairbanks
ATTORNEY.

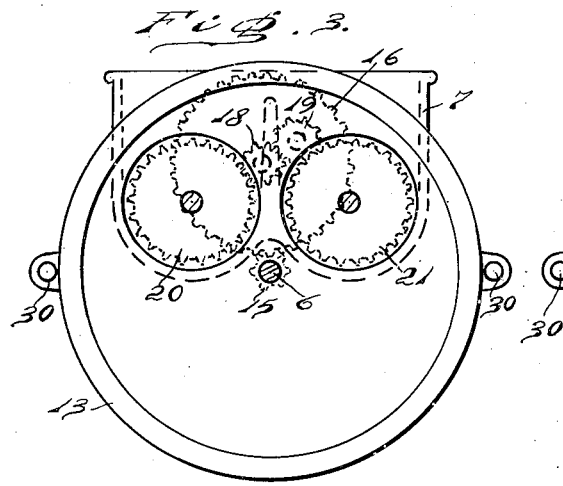
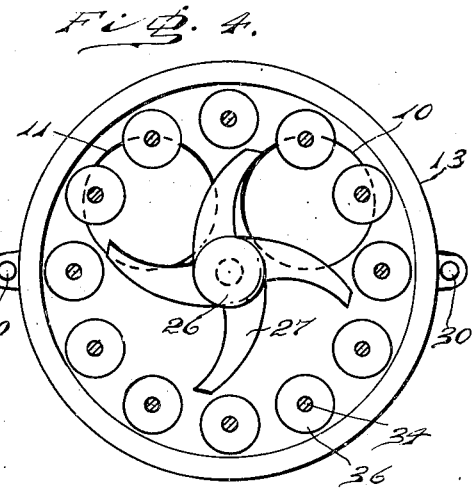
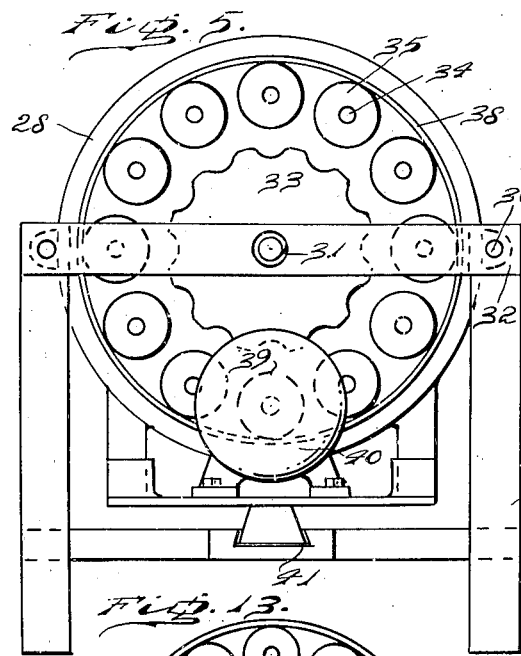
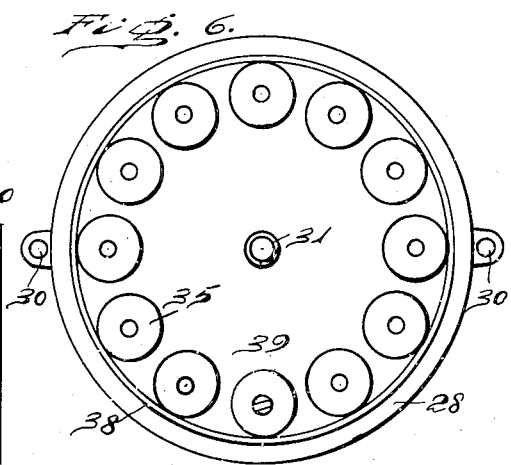
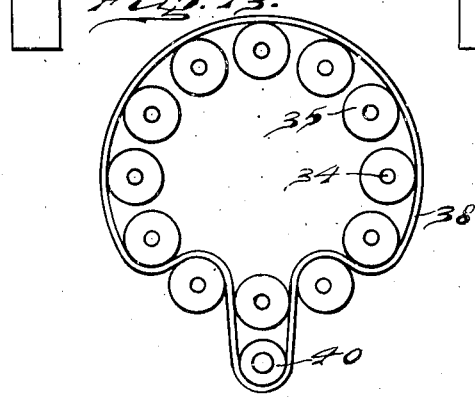
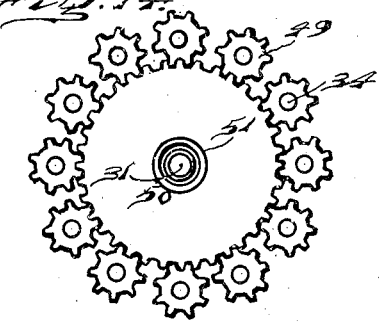

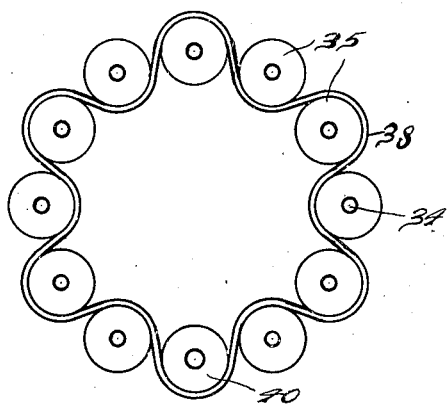
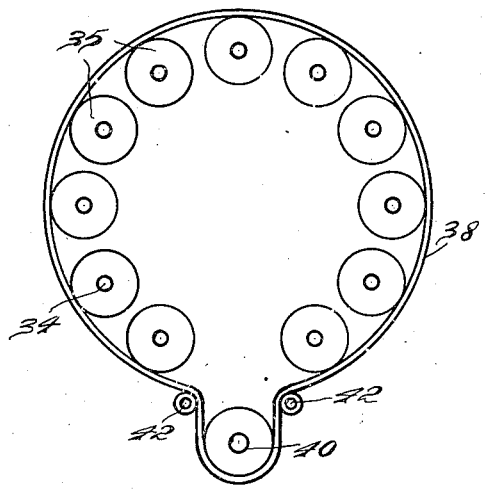
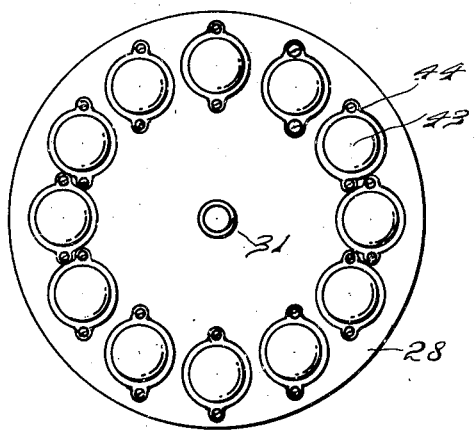
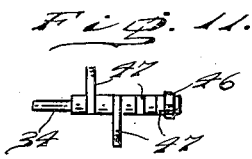
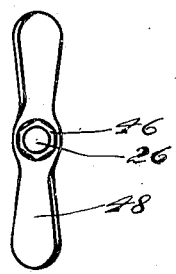
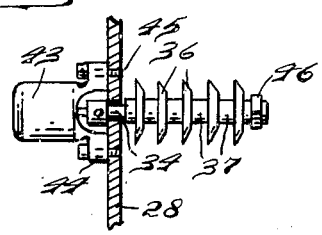

Patented Sept. 13, 1949

2,481,775

UNITED STATES PATENT OFFICE 2,481,775

CUTTING MACHINE

Christopher Offenhauser, Philadelphia, Pa.

Application July 11, 1945, Serial No. 604,413

1 Claim. (Cl. 146—106)

The object of this invention is to devise a novel cutting machine, and more particularly one wherein the material is reduced to a desired degree of fineness and a homogeneous condition.

The machine is adapted to treat many different types of material either alone or combined with other material.

The passage of revolving blades through the material, especially where the blades are in the form of knives has a tendency to heat it due to the friction, and many materials, for example meat and meat products, are deleteriously affected if the cutting operation is continued for a considerable period of time.

In accordance with the present invention, an inner rotary, bladed member feeds the material after it has acted thereon to outer rotary bladed members, which latter are revolved in a desired direction or directions and at desired speeds. The blades may be in the form of knives, mixing blades or smoothing blades depending upon the character of material to be treated and the final result to be attained. The outer bladed members may be driven by a single motor or by individual motors, and are preferably revolved at a high speed which may be greater than that of the inner bladed member.

The material to be treated is preferably continuously fed in a closed circulation to and from the chamber in which the bladed members revolve until the material has been reduced to a desired degree of fineness or smoothness, and during such feeding operation other materials can be added as desired.

With the foregoing and other objects in view, my invention comprehends a novel material treating machine.

It further comprehends a novel construction and arrangement of bladed members which may be knives, mixing blades or smoothing blades in many different arrangements.

It further comprehends a novel construction and arrangement of a head carrying the outer, rotary members, forming with a casing section a chamber to receive the material to be treated and the bladed members, and adjustable relatively thereto, and means for driving such members in a selected direction and at desired speeds.

For the purpose of illustrating the invention, I have shown in the accompanying drawings preferred embodiments thereof which in practice will give satisfactory and reliable results. It is, however, to be understood that these embodiments are typical only and that the various instrumentalities of which the invention consists can be variously arranged and organized and the invention is not limited to the exact arrangement and organization of these instrumentalities as herein set forth.

Figure 1 is a top plan view of a cutting machine embodying my invention.

Figure 2 is a longitudinal section substantially on the median line of the machine.

Figure 3 is an end elevation of section for the bladed members and the mixer casing to show more particularly some of the driving gearing.

Figure 4 is an end elevation of a head to show the relation of the bladed members.

Figure 5 is an end elevation of the machine.

Figure 6 is an end view of the head showing a driving arrangement for the pulleys of the outer, rotary members, Figure 7 is a modified form showing an end view of a pulley and belt drive.

Figure 8 is an end view showing another arrangement of a pulley and belt drive.

Figure 9 is an end elevation of the head, showing individual motors for driving the outer, rotary members.

Figure 10 is a fragmentary section of the head showing the blades driven by an individual motor as in Figure 9.

Figure 11 is an elevation of an outer, rotary member having its blades in the form of mixing blades.

Figure 12 is an end elevation of an embodiment of the invention in which the inner, rotary member has its blades in the form of a mixing or impeller blade.

Figures 13 and 14 show different driving arrangements for the bladed, outer members.

Similar numerals of reference indicate corresponding parts in the drawings.

Referring to the drawings:

The material to be treated is continuously fed to and from the chamber containing the bladed members in a similar manner to that shown in the Hottmann Patents No. 1,237,907 and No. 1,417,065, and employs two feed members as in my prior Patent No. 1,750,645.

1 designates the frame of the machine, the construction and arrangement of which may vary widely in practice. The frame carries an electric motor 2 which drives a pulley 3, around which a belt 4 passes, said belt also passing around a pulley 5 on a shaft 6, suitably journalled and disposed in a channel formed by a raised division wall of a mixer casing 7. The wall divides the casing 7 into two feed channels 23 and 25, communicating by openings 10 and 11, respectively, with the chamber 12 of a casing section 13 fixed to the mixer casing.

The shaft 6 passes through a gear box 14 and has a gear 15 meshing with a gear 16 on a shaft 17 which carries a gear 18 meshing with an idler 19 and a gear 20. The idler 19 also meshes with a gear 21 connected with a feed screw 22 to drive it, the feed screw revolving in a feed channel 23. The shaft 6 has a blade carrier 26 connected with it and this carrier is provided with a desired number of blades 27, which in Figures 2 and 4 are shown in the form of knives.

The construction thus far described is similar to that disclosed in the Hottmann and Offenhauser patents, hereinbefore mentioned.

The casing section 13 has a removable head or end member 28 having a bevelled forward end to form a fluid tight seal with the correspondingly shaped portion of the casing section. The head 28 is slidably mounted on guide rods 30 on the machine frame, and has fixed to it a worm screw 31 which extends through cross bars 32. A manually actuated worm 33 is in mesh with the worm screw 31 and positioned between the cross bars 32 to prevent its longitudinal movement relatively to the head, so that by turning the worm 33 the head 28 can be moved into its closed or open position.

The head has suitably mounted in it a desired number of circumferentially spaced shafts 34, provided outboard of the head with pulleys 35 and inboard of the head with blades 36 and spacers 37. The blades in Figures 2 and 4 are shown as being in the form of disc shaped cutters.

The pulleys 35 may be driven in any desired manner to revolve in a desired direction or directions and at desired speeds. In Figures 2, 5, 6, 7 and 8, the pulleys are belt driven by a belt 38 which as seen in Figure 2 passes around a pulley 39 on the shaft of an electric motor 40, fixed with respect to the head 28 to move in unison therewith and slidable in a guide 41 on the machine frame. This motor may be a high speed motor which can be controlled in the manner well known in the art to revolve at a desired speed. Belt tighteners 42 as in Figure 8 can be employed wherever desired. In Figures 2, 5 and 8, the belt engages the outer peripheries of the pulleys to cause them to revolve in the same direction, while in Figure 7 the belt passes around the outer periphery of one pulley and the inner periphery of the next pulley in series, so that some of the pulleys and the blades driven thereby revolve in one direction and others in the opposite direction. As will be evident the belt may pass around a selected number of pulleys to drive them in one direction or the opposite direction.

Electric motors up to one horse power and of very small size are now being made, and in Figures 9 and 10, I have shown a manner in which motors of this type can be employed to individually drive the pulleys. Motors 43 have brackets 44, fixed to the head 28 by fastening devices 45 and each motor has its shaft connected with a shaft 34 which carries the blades 36. The blades 36 and their spacers 37 are retained in assembled position by a nut 46 on a shaft 34, so that the blades can be removed whenever desired for replacement or sharpening. The motors 43 are preferably of the reversible type so that the blades driven thereby can be revolved in a selected direction and at a desired speed.

In Figure 11, I have shown mixer or smoothing blades 47 on a shaft 34, and in Figure 12, I have shown how mixer or impeller blades 48 can be secured to the blade carrier 26.

It will be apparent from the foregoing that the character of the blades employed for the bladed members will vary in accordance with the character of the material to be treated.

In the operation, the material to be treated is placed in the mixer casing 7 and is fed to the chamber 12 by the feed screw 22 and from the chamber 12 by the feed screw 24, the latter having a flat portion at its rear end to pass the material from the feed channel 25 to the feed channel 23. The motor driven shaft 6 revolves the blades 27 which feed the material by centrifugal action to the outer rotary blades 36. As soon as the material has been reduced to the desired degree of fineness, the opening leading from the feed channel 23 to the chamber 12 is blocked off in a similar manner to that shown in the Hottmann Patent No. 1,417,065 and the closure 49 is opened and the finished material is discharged from the machine.

When it is desired to change or inspect the blades or to clean the machine, the worm wheel 33 is turned to move the head 28 outwardly, the motor 40 moving with it, the blades are accessible for removal or inspection.

My present invention is designed to treat a large variety of different materials. For example it can be used to advantage as a cutter or as a mixer or for both cutting and mixing in the manufacture of food products such as sausage, scrapple, soups, candy and many others too numerous to specifically mention. It can be used to reduce paint, ink and similar material of a plastic or solid nature to a desired degree of fineness and smoothness.

In Figure 13, the pulleys are equally spaced and the belt 38 passes around the outer peripheries of two of the bottom pulleys and the outer periphery of the lowermost pulley.

In Figure 14, gears 49 have been substituted for the pulleys 35, and these gears mesh with a central gear 50 on a tubular shaft 51 of the motor.

It is of great importance that a machine of this character, especially if used to treat food and food products, be constructed so that it can be maintained in a sanitary condition. The present machine has been designed with this in view. By moving the blade carrying head outwardly, the chamber and the blades can be cleaned by hot water, steam or cleaning compounds, and if desired the blades can be removed for cleaning.

Having thus described my invention, what I claim as new and desire to secure by Letters Patent is:

In a cutting machine, a cylindrical casing having one end wall movable axially of the casing, a rotary shaft concentric with the casing, substantially radial cutting blades on said shaft arranged axially of and circumferentially about the shaft, a plurality of shafts journalled in said movable end wall and disposed circumferentially about said cutter blades, a series of circular cutters on said plurality of shafts forming substantially a wall about said central cutter blades, said casing having two openings in its fixed end, conveyor means to feed material into one opening and to receive material from the other opening and return it to the first opening, means for driving said circular cutter independently, and means to move said movable end wall and the outer cutters axially away from the fixed casing.

CHRISTOPHER OFFENHAUSER.

REFERENCES CITED

The following references are of record in the file of this patent:

UNITED STATES PATENTS

| Number | Name | Date |
| --- | --- | --- |
| 529,761 | Sturtevant | Nov. 27, 1894 |
| 743,753 | Richter | Nov. 10, 1903 |
| 1,237,907 | Hottmann | Aug. 21, 1917 |
| 1,417,065 | Hottmann | May 23, 1922 |
| 2,111,364 | Hopkins | Mar. 16, 1938 |
| 2,208,315 | Walma | July 16, 1940 |